G. C. TAFT.
Wrench.
No. 3 483. Reissued June 1, 1869.
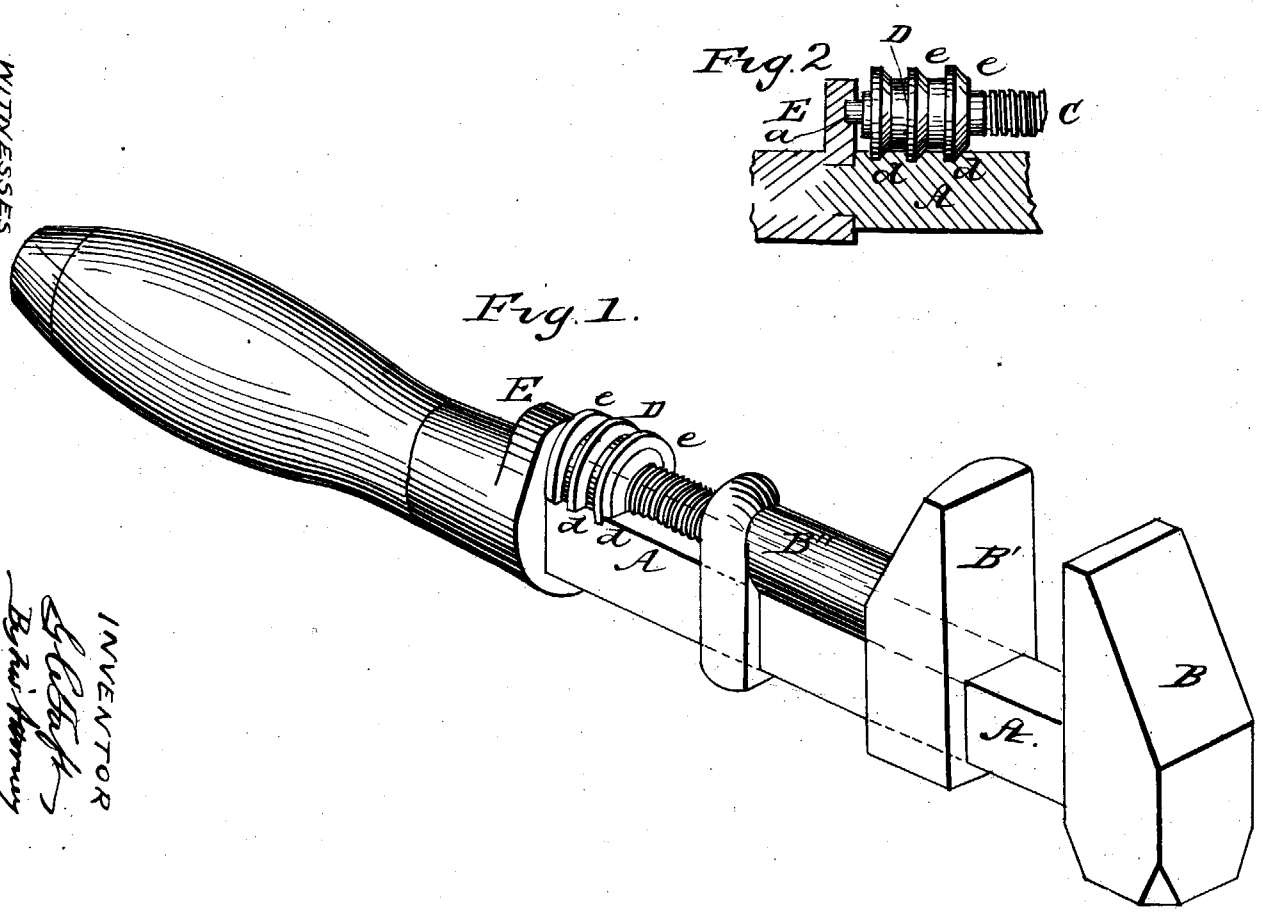
WITNESSES
W. Yorke Allen
A. Cavidicomb.
INVENTOR
G. C. Taft
By his Attorney
Thomas H. Dodge
N. PETERS, Photo-Lithographer, Washington, D. C.

UNITED STATES PATENT OFFICE.

LORING COES, OF WORCESTER, MASSACHUSETTS, ASSIGNEE, BY MESNE ASSIGNMENTS, OF GEORGE C. TAFT.

IMPROVEMENT IN WRENCHES.

Specification forming part of Letters Patent No. 40,590, dated November 10, 1863; Reissue No. 3,483, dated June 1, 1869.

*To all whom it may concern:*

Be it known that GEORGE C. TAFT, of the city and county of Worcester, and Commonwealth of Massachusetts, did invent a new and useful Improvement in Screw-Wrenches, of which the following is a full, clear, and exact description, reference being had to the accompanying drawings, forming a part of this specification, in which—

Figure 1 represents a perspective view of a "Coes Wrench" having the said Taft's improvements applied thereto; and Fig. 2 represents sections of detached parts of the wrench shown in Fig. 1.

Similar letters of reference indicate like parts in the drawings.

To enable those skilled in the art to make and use the said invention, I will describe the same more in detail.

The nature of the said Taft's invention relates to a mode of constructing the Coes wrench, patented April 16, 1841, in such a manner that the handle shall be relieved from the back thrust or strain of the rosette-screw when the wrench is used. In my said wrench the rosette presses against the ferrule, and the ferrule in turn against the front end of the handle, whereby the handle was often split and broken.

In the drawings, A is the shank of the wrench; B, the stationary jaw, and B′ the sliding jaw, through the part B″ of which the operating-screw C works. D is the rosette, formed in one piece with the screw C, as shown, and journaled at *a* to the ferrule E.

Parallel grooves *d d d*, in this instance, are cut in the shank A, at right angles to the line of motion of the movable jaw B″, in which grooves projections *e e e* of the rosette turn.

The projections *e e e* are made parallel to each other and are beveled on one side, as shown, to lessen the friction of the rosette in turning.

The operation is as follows: To adapt the opening between the jaws to the size of the object to be clasped thereby, the operator turns the rosette to the right or left, as the size of the object may require, which will turn the screw in the part B″ of the sliding jaw B′, thereby increasing or diminishing, as the case may be, the distance between the jaws, as required.

The advantage of this improvement is that the pressure which otherwise would come upon the handle is transferred to the shank of the wrench, thus obviating one, and really the only serious, objection to the said Coes wrench.

I am aware that the rosettes of screw-wrenches have been constructed with screw-threads, and such devices are not claimed; but

What is claimed as the invention of the said GEORGE C. TAFT, and desired to have secured by Letters Patent, is—

1. An improved Coes wrench, so constructed that the thrust or back strain of the rosette-screw, when the wrench is used, shall be borne by the shank instead of the handle of the wrench, substantially as described.

2. A notch formed at right angles to the line of motion of the movable jaw in the shank of a Coes wrench for relieving the handle from the back strain of the rosette-screw, substantially as described.

3. The combination of two or more parallel grooves, *d*, in the shank A with two or more corresponding projections, *e*, on the rosette D, the same not being spiral, but running at right angles to the line of motion of the jaw, substantially as described.

LORING COES.

Witnesses:
THOS. H. DODGE,
GEO. H. MILLER.